US007020072B1

(12) United States Patent
Li et al.

(10) Patent No.: US 7,020,072 B1
(45) Date of Patent: Mar. 28, 2006

(54) ORTHOGONAL FREQUENCY DIVISION MULTIPLEXING TRANSMIT DIVERSITY SYSTEM FOR FREQUENCY-SELECTIVE FADING CHANNELS

(75) Inventors: Xiaodong Li, Bellevue, WA (US); Constantinos Basil Papadias, Madison, NJ (US); Harish Viswanathan, Matawan, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/568,170

(22) Filed: May 9, 2000

(51) Int. Cl.
*H04J 11/00* (2006.01)
(52) U.S. Cl. .................... 370/208; 370/343; 455/101
(58) Field of Classification Search ............... 370/204, 370/206, 208, 210, 343; 375/148, 299, 267; 455/101
See application file for complete search history.

(56) References Cited

U.S. PATENT DOCUMENTS

| | | | |
|---|---|---|---|
| 5,914,933 A | 6/1999 | Cimini et al. | |
| 6,317,411 B1 * | 11/2001 | Whinnett et al. | 370/204 |
| 6,377,631 B1 * | 4/2002 | Raleigh | 375/299 |
| 6,542,556 B1 * | 4/2003 | Kuchi et al. | 375/299 |
| 6,628,638 B1 * | 9/2003 | Sato et al. | 370/343 |
| 6,728,302 B1 * | 4/2004 | Dabak et al. | 375/148 |
| 6,775,260 B1 * | 8/2004 | Dabak et al. | 370/342 |

FOREIGN PATENT DOCUMENTS

WO    WO 99/14871    3/1999

OTHER PUBLICATIONS

S.M. Alamouti, "A Simple Transmit Diversity Technique for Wireless Communications", *IEEE Journal on Select Areas in Communications*, vol. 16, No. 8, pp. 1451-1458, Oct. 1998.
V. Tarokh et al., "Space-Time Block Codes from Orthogonal Designs". *IEEE Transactions on Information Theory*, vol. 45, No. 5, pp 1456-1467, Jul. 1999.

* cited by examiner

*Primary Examiner*—Frank Duong
*Assistant Examiner*—Melanie Jagannathan
(74) *Attorney, Agent, or Firm*—Thomas Stafford

(57) ABSTRACT

Wireless communications for frequency-selective fading channels is realized by employing a system including orthogonal frequency division multiplexing (OFDM) in combination with an at least two antenna transmit diversity arrangement. Specifically, OFDM converts a multipath channel into a plurality of narrowband subchannels each having flat fading. Then, the signals on the same frequency subchannels of the at least two antennas are grouped together. Considering a first frequency subchannel, during a first OFDM time interval, a first signal and a second signal are transmitted on the first frequency subchannel from a first antenna (0) and from a second antenna (1), respectively. During a second OFDM time interval, a reverse sign (-) complex conjugate of the second signal and a complex conjugate of the first signal are transmitted from the first antenna and the second antenna, respectively. In a specific embodiment of the invention, reduced complexity in the implementation is realized by a reverse order complex conjugate and a reverse order, reverse sign (-) complex conjugate and judicious selection of the processed data signals in order to transmit the appropriate ones of the signals during the first and second OFDM intervals. Again, if the channel remains constant over the two OFDM intervals, diversity combination is realized for each frequency subchannel. In another embodiment of the invention, antenna-group hopping is employed in conjunction with pairing in time of the OFDM frequency subchannel signals to realize increased transmit diversity without rate loss.

60 Claims, 5 Drawing Sheets

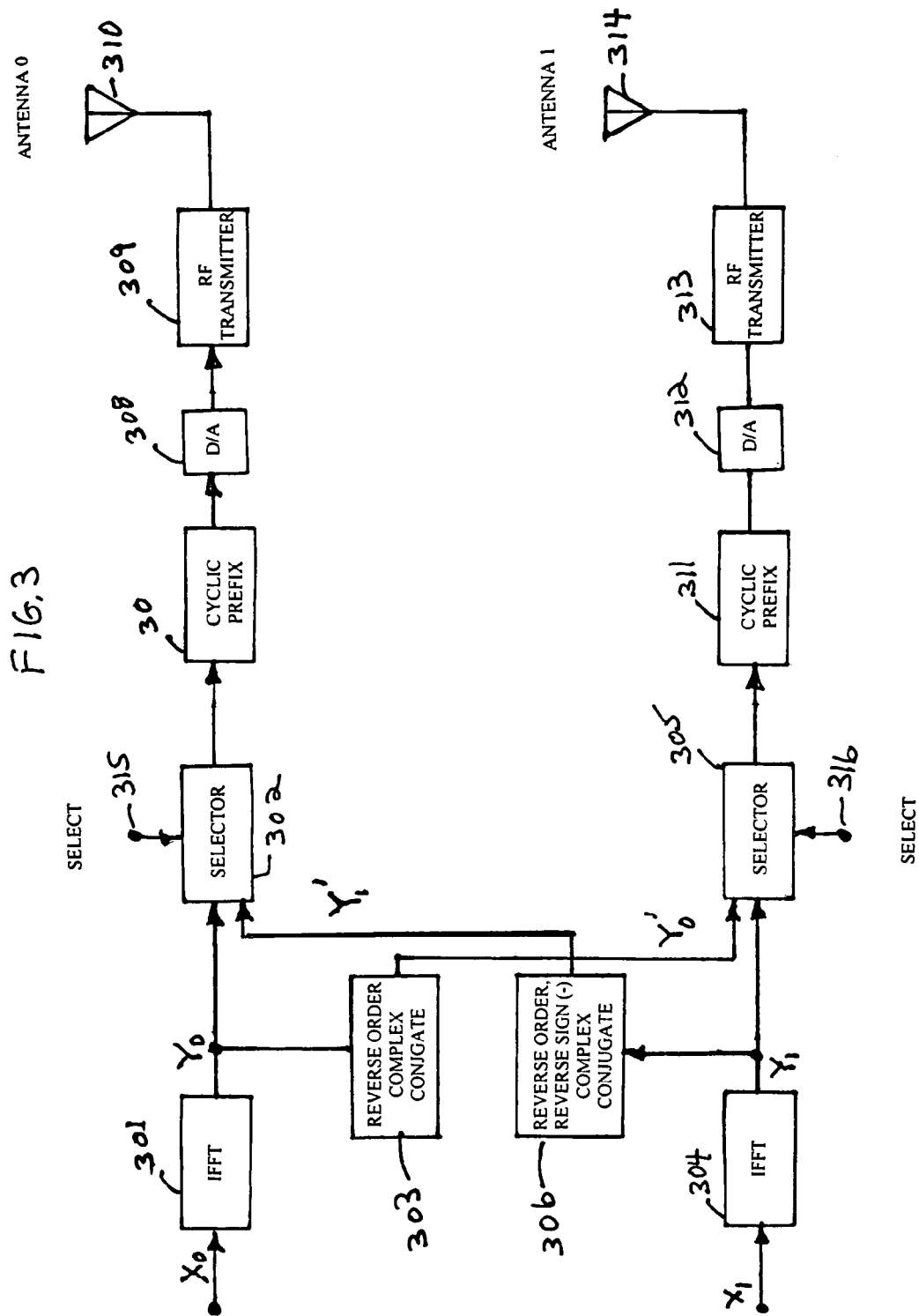

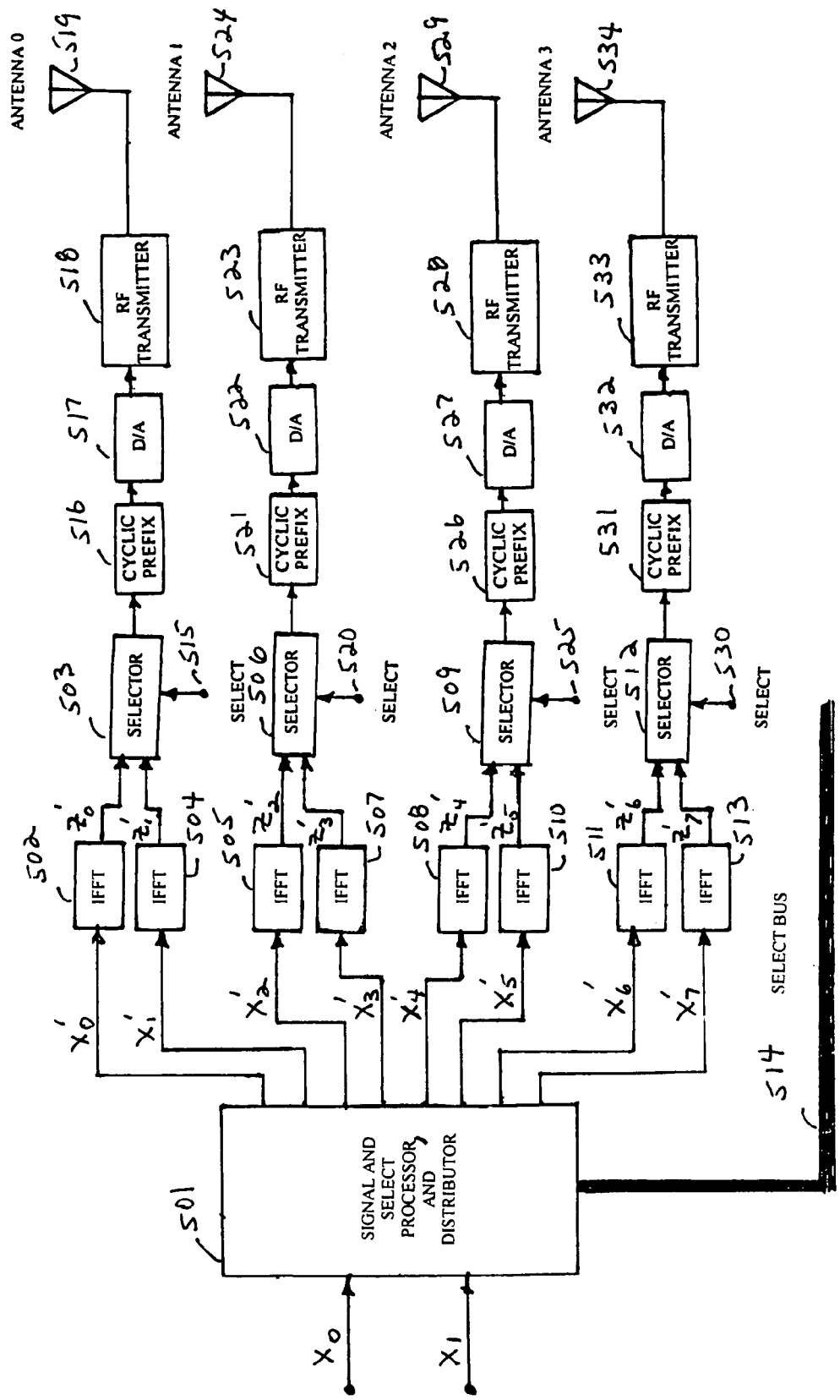

FIG. 6

$$\begin{cases} X'_0 = [x_0(0),\ 0,\ x_0(2),\ 0,\ x_0(4),\ 0,\ x_0(6),\ 0,\ \cdots] \\ X'_1 = [-x_1^*(0),\ 0,\ -x_1^*(2),\ 0,\ -x_1^*(4),\ 0,\ -x_1^*(6),\ 0,\ \cdots] \\ X'_2 = [x_1(0),\ 0,\ 0,\ x_0(3), x_1(4),\ 0,\ 0,\ x_0(7),\ \cdots] \\ X'_3 = [x_0^*(0),\ 0,\ 0,\ -x_1^*(3), x_0^*(4),\ 0,\ 0,\ -x_1^*(7),\ \cdots] \\ X'_4 = [0,\ x_0(1), x_1(2),\ 0,\ 0,\ x_0(5), x_1(6),\ 0,\ \cdots] \\ X'_5 = [0,\ -x_1^*(1), x_0^*(2),\ 0,\ 0,\ -x_1^*(5), x_0^*(6),\ 0,\ \cdots] \\ X'_6 = [0,\ x_1(1),\ 0,\ x_1(3),\ 0,\ x_1(5),\ 0,\ x_1(7),\ \cdots] \\ X'_7 = [0,\ x_0^*(1),\ 0,\ x_0^*(3),\ 0,\ x_0^*(5),\ 0,\ x_0^*(7),\ \cdots] \end{cases}$$

ORTHOGONAL FREQUENCY DIVISION MULTIPLEXING TRANSMIT DIVERSITY SYSTEM FOR FREQUENCY-SELECTIVE FADING CHANNELS

TECHNICAL FIELD

This invention relates to wireless communications and, more particularly, to orthogonal frequency division multiplexing (OFDM) transmission systems.

BACKGROUND OF THE INVENTION

Arrangements are know for realizing transmit diversity for flat-fading transmission channels in wireless communications systems. One such prior known system of particular interest is described in an article authored by S. M. Alamouti an entitled "A Simple Transmit Diversity Technique for Wireless Communications", *IEEE Journal On Select Areas In Communications*, Vol. 16, No. 8, pp. 1451–1458, October 1998. Also see PCT published patent application WO9914871A1 issued Mar. 25, 1999 to Alamouti et al. However, the Alamouti arrangement cannot be directly applied to frequency-selective fading channels. Moreover, the Alamouti arrangement leads to transmission rate loss when more than two (2) transmit antennas are employed. Additionally, other space-time block coding arrangements in the same spirit as the Alamouti arrangement can also result in rate loss when the number of transmit antennas is greater than two (2). See for example, an article authored by V. Tarokh et al. entitled "Space-time block codes from orthogonal designs", *IEEE Transactions on Information Theory*, Vol. 45, pp. 1456–1467, July 1999, for such space-time block coding.

SUMMARY OF THE INVENTION

Problems and/or limitations of transmit diversity arrangements for wireless communications are overcome for frequency-selective fading channels by employing a system including orthogonal frequency division multiplexing (OFDM) in combination with an at least two antenna transmit diversity arrangement. Specifically, OFDM converts a multipath channel into a plurality of narrowband subchannels each having flat fading. Then, the signals on the same subchannels of the at least two antennas are grouped together. Considering a first frequency subchannel, during a first OFDM time interval, a first signal and a second signal are transmitted on the first frequency subchannel from a first antenna (0) and from a second antenna (1), respectively. During a second OFDM time interval, a reverse sign (−) complex conjugate of the second signal and a complex conjugate of the first signal are transmitted from the first antenna and the second antenna, respectively.

In a specific embodiment of the invention, reduced complexity in the implementation is realized by employing a reverse order complex conjugate and a reverse order, reverse sign (−) complex conjugate and by judicious selection of the processed data signals in order to transmit the appropriate ones of the signals during the first and second OFDM intervals. Again, if the channel remains constant over the two OFDM intervals, diversity combination is realized for each frequency subchannel.

In another embodiment of the invention, antenna-group hopping is employed in conjunction with pairing in time of the OFDM frequency subchannel signals to realize increased transmit diversity without rate loss.

BRIEF DESCRIPTION OF THE DRAWING

FIG. 3 shows, in simplified block diagram form, details of a reduced complexity implement of an OFDM transmit diversity system in accordance with the invention;

FIG. 5 shows, in simplified block diagram form, details of an embodiment of the invention for use in effecting antenna-group hopping in an OFDM transmit diversity system; and FIG. 6 is an example matrix of OFDM signals that may advantageously employed in the embodiment of the invention illustrated in FIG. 5.

DETAILED DESCRIPTION

Figure 1A:
FIG. 1A graphically illustrates the pairing of signals in time for use in an embodiment of the invention in transmitting from a first antenna in an OFDM transmit diversity system.

FIG. 1A graphically illustrates the pairing of signals in time for use in an embodiment of the invention in transmitting from a first antenna, antenna 0, in an OFDM transmit diversity system. Specifically, shown are signal components $x_0(0)$ and $-x_1^*(0)$ along the vertical time axis prior to their inverse fast Fourier transform (IFFT) and where the * denotes the complex conjugate.

Figure 1B:
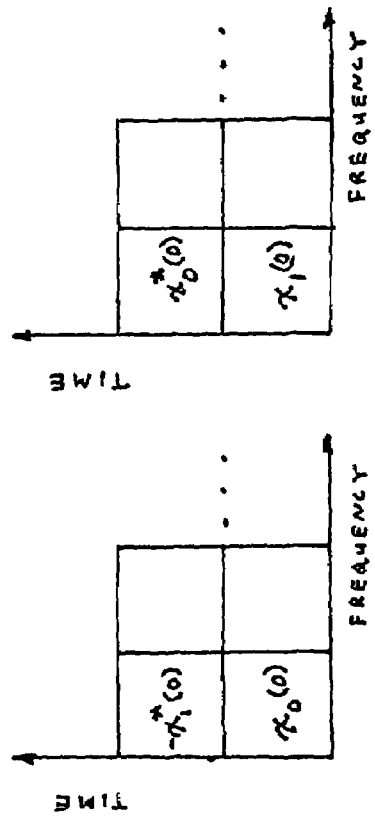
FIG. 1B graphically illustrates the pairing of signals in time for use in an embodiment of the invention in transmitting from a second antenna in an OFDM transmit diversity system.

Similarly, FIG. 1B graphically illustrates the pairing of signals in time for use in an embodiment of the invention in transmitting from a second antenna, antenna 1, in an OFDM transmit diversity system. Specifically, shown are signal components $x_1(0)$ and $x_0^*(0)$ along the vertical time axis prior to their inverse fast Fourier transform (IFFT and where the * denotes the complex conjugate.

Thus, in a first OFDM interval, the signal pairing is such that signal component $x_0(0)$ is transmitted from antenna 0 and signal $x_1(0)$ is transmitted from antenna 1, and in a second OFDM interval, the signal pairing is such that signal component $-x_1^*(0)$ is transmitted from antenna 0 and signal component $x_0^*(0)$ is transmitted from antenna 1. Again, the * denotes the complex conjugate of the signal.

Figure 2:
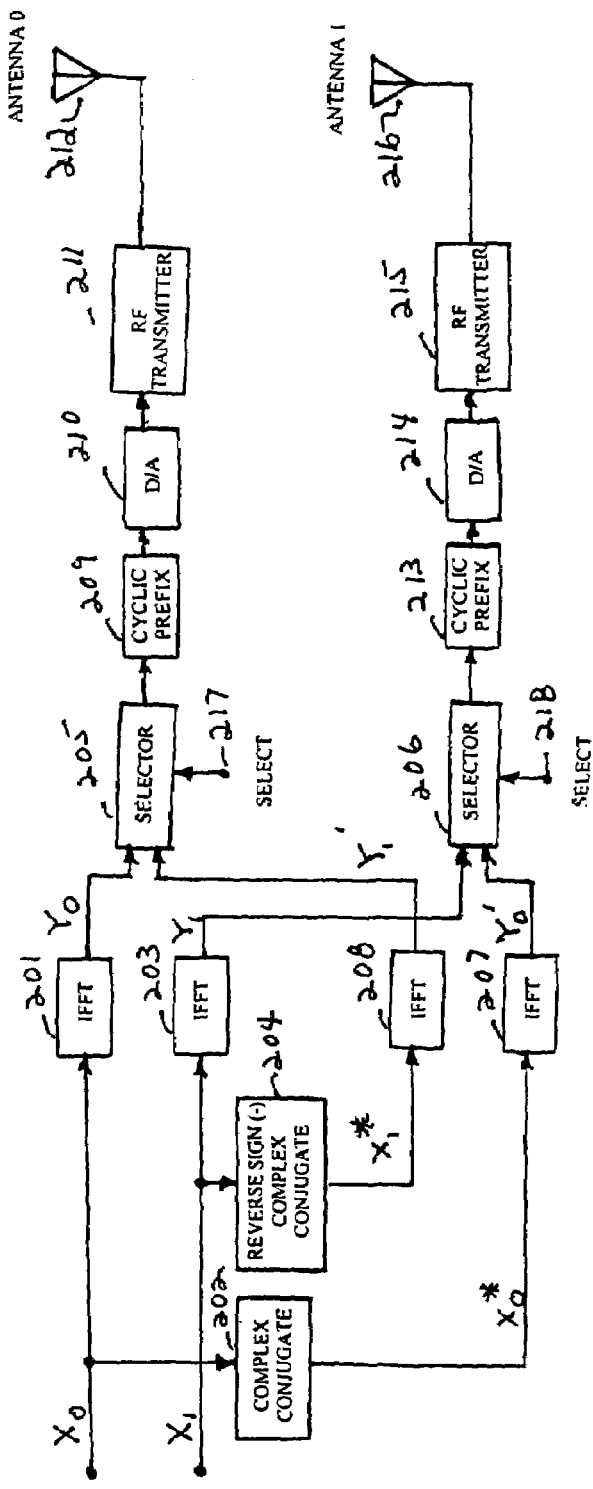
FIG. 2 shows, in simplified block diagram form, details of an embodiment of the invention.

FIG. 2 shows, in simplified block diagram form, details of an embodiment of the invention. Specifically, N length signal vector $X_0=[x_0(0), x_0(1), \ldots, x_0(N-1)]$ to be transmitted is supplied to inverse fast Fourier transform (IFFT) unit 201, and to complex conjugate unit 202. Note that signal $X_0$ is a digital signal that has already been encoded and modulated, e.g., using phase shift keying (PSK), quadrature amplitude modulation (QAM) or the like. IFFT unit 201 obtains the inverse fast Fourier transform of signal $X_0$, in well known fashion, and yields $Y_0$. In this example, $Y_0=[y_0(0),y_0(1), \ldots ,(N-1)]=F^{-1}(X_0)$, which is the N-point IFFT of $X_0$ and where $$y_0(n) = \frac{1}{\sqrt{N}} \sum_{m=0}^{N-1} x_0(m)e^{j2\pi mn/N},$$

for n=0, ..., N−1. In turn, $Y_0$ is supplied to a first input of controllable selector 205.

Similarly, N length signal vector $X_1=[x_1(0),x_1(1), \ldots, x_1(N-1)]$ also to be transmitted is supplied to inverse fast Fourier transform (IFFT) unit 203, and to reverse sign (−) complex conjugate unit 204. Note that signal $X_1$ is also a digital signal that has already been encoded and modulated, e.g., using PSK, QAM or the like. IFFT unit 203 obtains the inverse fast Fourier transform of signal $X_1$, in well known fashion, and yields $Y_1$. In this example, $Y_1=[y_1(0), y_1(1), \ldots, y_1(N-1)]=F^{-1}(X_1)$, which is the N-point IFFT of $X_1$ and where $$y_1(n) = \frac{1}{\sqrt{N}} \sum_{m=0}^{N-1} x_1(m)e^{j2\pi mn/N},$$

for n=0, ..., N−1. In turn, $Y_1$ is supplied to a first input of controllable selector 206.

An output from complex conjugate unit 203 is $X_0^*=[x_0^*(0),x_0^*(1), \ldots ,x_0^*(N-1)]$. Again, where "*" indicates complex conjugate. Then, signal $X_0^*$ to be transmitted is supplied to inverse fast Fourier transform (IFFT) unit 207. IFFT unit 207 generates an inverse fast Fourier transform of $X_0^*$, in well known fashion, namely, $Y_0'=[y_0'(0), y_0'(1), \ldots, y_0'(N-1)]=F^{-1}(X_0^*)$, where $$y_0'(n) = \frac{1}{\sqrt{N}} \sum_{m=0}^{N-1} x_0^*(m)e^{j2\pi mn/N},$$

for n=0, ..., N−1. In turn, $Y_0'$ is supplied to a second input of controllable selector 206.

An output from reverse sign (−) complex conjugate unit 205 is $-X_1^*=[-x_1^*(0),-x_1^*(1), \ldots ,-x_1^*(N-1)]$. Then, signal $-X_1^*$ to be transmitted is supplied to inverse fast Fourier transform (IFFT) unit 208. IFFT unit 208 generates an inverse fast Fourier transform of $-X_1^*$, in well know fashion, namely, $Y_1'=[y_1'(0),y_1'(1), \ldots , y_1'(N-1)]=F^{-1}(X_1^*)$, where $$y_1'(n) = \frac{1}{\sqrt{N}} \sum_{m=0}^{N-1} -x_1^*(m)e^{j2\pi mn/N},$$

for n=0, ..., N−1. In turn, $Y_1'$ is supplied to a second input of controllable selector 205.

It is noted that signals $X_0$, $X_1$, $X_0^*$, and $-X_1^*$ are frequency domain signals, and that $Y_0$, $Y_1$, $Y_0'$, and $Y_1'$ are time domain signals.

Controllable selector 205, under control of select input 217, supplies $Y_0$ during a first, e.g., an even, OFDM interval and $Y_1'$ during a second, e.g., an odd, OFDM interval, as an output which is supplied to cyclic prefix unit 209. In turn, cyclic prefix unit 209 prepends a cyclic prefix to each OFDM interval, i.e., each symbol period. The cyclic prefix is used to compensate for the dispersion introduced by the channel response and by a pulse shaping filter (not shown) used in the transmitter. Note that the cyclic prefix is added only for those tones used in an OFDM transmitter. Since the instant transmitter is primarily intended for use in a base station, a cyclic prefix is added for all of the available orthogonal tones. However, if the transmitter were to be used in a mobile unit using only a single OFDM tone, then the cyclic prefix uses only the particular single tone being used by the mobile unit. Then, the prepended $Y_0$ or $Y_1'$ signal is converted to analog form via digital-to-analog (D/A) converter 210 and supplied to RF transmitter 211 for transmission via antenna 212, i.e., antenna 0. Note that RF transmitter 211 performs a conventional baseband-to-passband conversion of the OFDM signal for transmission.

Similarly, controllable selector 206, under control of select input 218, supplies $Y_1$ during a first, e.g., an even, OFDM interval and $Y_0'$ during a second, e.g., an odd, OFDM interval, as an output to cyclic prefix unit 213. In turn, cyclic prefix unit 213 prepends a cyclic prefix to each OFDM interval, i.e., each symbol period. The cyclic prefix is used to compensate for the dispersion introduced by the channel response and by a pulse shaping filter (not shown) used in the transmitter. Note that the cyclic prefix is added only for those tones used in an OFDM transmitter. Since the instant transmitter is primarily intended for use in a base station, a cyclic prefix is added for all of the available orthogonal tones. However, if the transmitter were to be used in a mobile unit using only a single OFDM tone, then the cyclic prefix uses only the particular single tone being used by the mobile unit. Then, the prepended $Y_1$ or $Y_0'$ signal is converted to analog form via digital-to-analog (D/A) converter 214 and supplied to RF transmitter 215 for transmission via antenna 216, i.e., antenna 1.

FIG. 3 shows, in simplified block diagram form, details of a reduced complexity implement of an OFDM transmit diversity system in accordance with the invention. Specifically, N length signal vector $X_0=[x_0(0),x_0(1), \ldots , x_0(N-1)]$ to be transmitted is supplied to inverse fast Fourier transform (IFFT) unit 301 which obtains the inverse fast Fourier transform of signal $X_0$, in well known fashion, and yields $Y_0$. In this example, $Y_0=[y_0(0), y_0(1), \ldots ,(N-1)]=F^{-1}(X_0)$, which is the N-point IFFT of $X_0$ and where $$y_0(n) = \frac{1}{\sqrt{N}} \sum_{m=0}^{N-1} x_0(m)e^{j2\pi mn/N},$$

for n=0, ..., N−1. In turn, $Y_0$ is supplied to a first input of controllable selector 302 and to reverse order complex conjugate unit 303. Note that signal vector $X_0$ is a digital signal that has already been encoded and modulated, e.g., using PSK, QAM or the like.

Similarly, N length signal vector $X_1=[x_1(0),x_1(1), \ldots, x_1(N-1)]$ to be transmitted is supplied to inverse fast Fourier transform (IFFT) unit 304 which obtains the inverse fast Fourier transform of signal $X_1$, in well known fashion, and yields $Y_1$. In this example, $Y_1=[y_1(0),y_1(1), \ldots, y_1(N-1)]=F^{-1}(X_1)$, which is the N-point IFFT of $X_1$ and where $$y_1(n) = \frac{1}{\sqrt{N}} \sum_{m=0}^{N-1} x_1(m) e^{j2\pi mn/N},$$

for $n=0, \ldots, N-1$. In turn, $Y_1$ is supplied to a first input of controllable selector 305 and to reverse order, reverse sign (−) complex conjugate unit 306. Note that signal vector $X_1$ is also a digital signal that has already been encoded and modulated, e.g., using PSK, QAM or the like.

Reverse order complex conjugate unit 303 generates the inverse Fourier transform of $X_0^*$ from $Y_0$, namely, $Y_0'=[y_0'(0), y_0'(1), \ldots, y_0'(N-0)]=F^{-1}(X_0^*)$, where $$y_0'(n) = \frac{1}{\sqrt{N}} \sum_{m=0}^{N-1} x_0^*(m) e^{j2\pi mn/N} = y_0^*(N-n),$$

for $n=0, \ldots, N-1$ and where * denotes the complex conjugate. Note with reverse order, $y_0'(0)=y_0^*(N)=y_0^*(0)$, $y_0'(1)=y_0^*(N-1), \ldots y_0'(N-1)=y_0^*(1)$. In turn, $Y_0'$ is supplied to a second input of controllable selector 305. Note that controllable selector 305 is controlled via a signal supplied to control input 314 to select as an output, either a signal supplied to its first input or a signal supplied to its second input, namely, either $Y_1$ or $Y_0'$, respectively.

Similarly, reverse order, reverse sign (−) complex conjugate unit 306 generates the inverse sign (−), reverse order Fourier transform of $X_1^*$ of $Y_1$, namely, $Y_1'=[y_1'(0),y_1'(1), \ldots, y_1'(N-1)]=F^{-1}(X_1^*)$, where $$y_1'(n) = \frac{1}{\sqrt{N}} \sum_{m=0}^{N-1} -x_1^*(m) e^{j2\pi mn/N} = -y_1^*(N-n),$$

for $n=0, \ldots, N-1$ and where * denotes the complex conjugate. Note with reverse order, $y_1'(0)=-y_1^*(N)=-y_1^*(0)$, $y_1'(1)=-y_1^*(N-1), \ldots, y_1'(N-1)=-y_1^*(1)$. In turn, $Y_1'$ is supplied to a second input of controllable selector 302. Note that controllable selector 302 is also controlled via a signal supplied to control input 313 to select as an output, either a signal supplied to its first input or a signal supplied to its second input, namely, either $Y_0$ or $Y_1'$, respectively.

An output from controllable selector 302 is supplied to cyclic prefix unit 307, which prepends a cyclic prefix to each OFDM interval, i.e., each symbol period. The cyclic prefix is used to compensate for the dispersion introduced by the channel response and by a pulse shaping filter (not shown) used in the transmitter. Note that the cyclic prefix is added only for those tones used in an OFDM transmitter. Since the instant transmitter is primarily intended for use in a base station, a cyclic prefix is added for all of the available orthogonal tones. However, if the transmitter were to be used in a mobile unit using only a single OFDM tone, then the cyclic prefix uses only the particular single tone being used by the mobile unit. Then, the prepended $Y_0$ or $Y_1'$ signal is converted to analog form via digital-to-analog (D/A) converter 308 and supplied to RF transmitter 309 for transmission via antenna 310, i.e., antenna 0.

Similarly, an output from controllable selector 305 is supplied to cyclic prefix unit 311, which prepends a cyclic prefix to each OFDM interval, i.e., each symbol period. Again, the cyclic prefix is used to compensate for the dispersion introduced by the channel response and by a pulse shaping filter (not shown) used in the transmitter. Note that the cyclic prefix is added only for those tones used in an OFDM transmitter. Since the instant transmitter is primarily intended for use in a base station, a cyclic prefix is added for all of the available orthogonal tones. However, if the transmitter were to be used in a mobile unit using only a single OFDM tone, then the cyclic prefix uses only the particular single tone being used by the mobile unit. Then, the prepended $Y_1$ or $Y_0'$ signal is converted to analog form via digital-to-analog (D/A) converter 312 and supplied to RF transmitter 313 for transmission via antenna 314, i.e., antenna 1.

Thus, in first, e.g., even, OFDM intervals controllable selectors 302 and 305 select signal vectors $Y_0$ and $Y_1$, respectively, and in second, e.g., odd, OFDM intervals controllable selectors select signal vectors $Y_1'$ and $Y_0'$, respectively. Therefore, in the first OFDM intervals, a signal vector version of $Y_0$ after the cyclic prefix is prepended and then D/A converted is supplied for transmission to antenna (0) 310 and a signal vector version of $Y_1$ after the cyclic prefix is prepended and then D/A converted is supplied for transmission to antenna (1) 314. In second, e.g., odd, OFDM intervals, a signal vector version of $Y_1'$ after the cyclic prefix is prepended and then D/A converted is supplied for transmission to antenna (0) 310 and a signal vector version of $Y_0'$ after the cyclic prefix is prepended and then D/A converted is supplied for transmission to antenna (1) 314.

Therefore, it is seen that the transmit diversity is realized in OFDM by employing a significantly less complex implement than that shown in FIG. 2.

In another embodiment of the invention, more than two transmit antennas are advantageously employed to realize the transmit diversity. In each frequency subchannel two of the antennas are grouped together and use the signal pattern shown in FIGS. 1A and 1B. It is noted that the grouping pattern, i.e., the selection of antennas for each frequency subchannel may vary.

Further note that although the following example employs four antennas any number greater than two may be employed. Additionally, hereinafter "frequency subchannel" is referred to as just "subchannel".

Figure 4A:
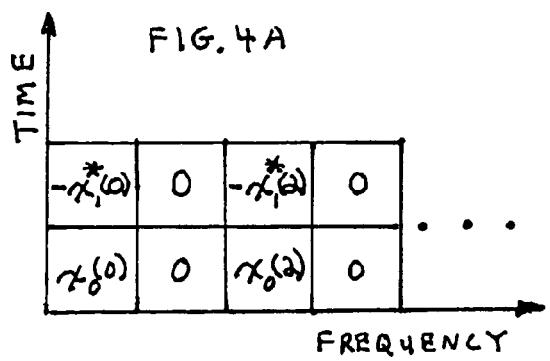
FIG. 4A graphically illustrates the pairing of signals in time for use in an embodiment of the invention in transmitting from a first antenna in an antenna-group hopping OFDM transmit diversity system.

FIG. 4A graphically illustrates the pairing of signals in time for use in an embodiment of the invention in transmitting from a first antenna, in this example, antenna 0, in an antenna-group hopping OFDM transmit diversity system. Thus, as shown, in a first OFDM time interval: a first subchannel includes signal component $x_0(0)$; a second subchannel includes a zero (0); a third subchannel includes signal component $x_0(2)$; a fourth subchannel includes a zero (0); etc., and in a second OFDM time interval: the first subchannel includes signal component $-x_1^*(0)$; the second subchannel includes a zero (0); the third subchannel includes signal component $-x_1^*(2)$; a fourth subchannel includes a zero (0); etc.

Figure 4B:
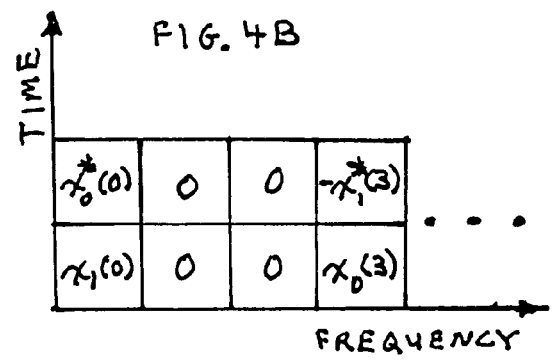
FIG. 4B graphically illustrates the pairing of signals in time for use in an embodiment of the invention in transmitting from a second antenna in an antenna-group hopping OFDM transmit diversity system.

FIG. 4B graphically illustrates the pairing of signals in time for use in an embodiment of the invention in transmitting from a second antenna in an antenna-group hopping OFDM transmit diversity system. Thus, as shown, in a first OFDM time interval: a first subchannel includes signal component $x_1(0)$; a second subchannel includes a zero (0); a third subchannel includes a zero (0); a fourth subchannel includes signal component $x_0^*(3)$; etc., and in a second OFDM time interval: the first subchannel includes signal component $x_0^*(0)$; the second subchannel includes a zero (0); the third subchannel includes a zero (0); a fourth subchannel includes signal component $-x_1^*(3)$; etc.

Figure 4C:
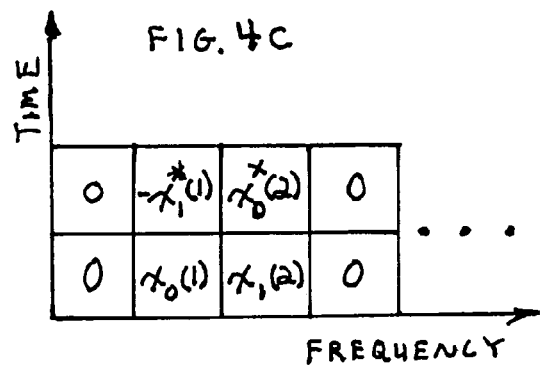
FIG. 4C graphically illustrates the pairing of signals in time for use in an embodiment of the invention in transmitting from a third antenna in an antenna-group hopping OFDM transmit diversity system.

FIG. 4C graphically illustrates the pairing of signals in time for use in an embodiment of the invention in transmitting from a third antenna in an antenna-group hopping OFDM transmit diversity system. Thus, as shown, in a first OFDM time interval: a first subchannel includes a zero (0); a second subchannel includes signal component $x_0(1)$; a third subchannel includes signal component $x_1(2)$; a fourth subchannel includes a zero (0); etc., and in a second OFDM time interval: the first subchannel includes a zero (0); the second subchannel includes signal component $-x_1^*(1)$; the third subchannel includes signal component $x_0^*(2)$; a fourth subchannel includes a zero (0); etc.

Figure 4D:
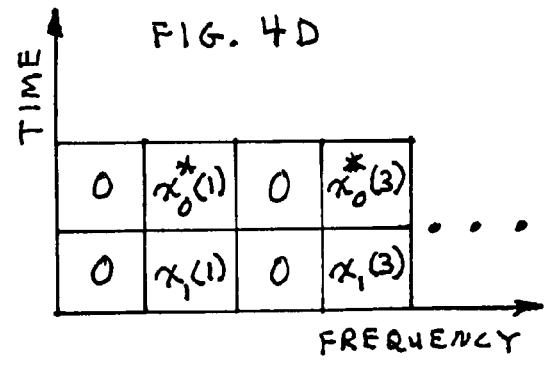
FIG. 4D graphically illustrates the pairing of signals in time for use in an embodiment of the invention in transmitting from a fourth antenna in an antenna-group hopping OFDM transmit diversity system.

FIG. 4D graphically illustrates the pairing of signals in time for use in an embodiment of the invention in transmitting from a fourth antenna in an antenna-group hopping OFDM transmit diversity system. Thus, as shown, in a first OFDM time interval: a first subchannel includes a zero (0); a second subchannel includes signal component $x_1(1)$; a third subchannel includes a zero (0); a fourth subchannel includes signal component $x_1(3)$; etc., and in a second OFDM time interval: the first subchannel includes a zero (0); the second subchannel includes signal component $x_0^*(1)$; the third subchannel includes a zero (0); a fourth subchannel includes signal component $x_0^*(3)$; etc.

As shown, in each group of two (2) antennas, the signal components are paired in time on each subchannel. In this example, the grouping of the antennas varies from subchannel to subchannel. On a first subchannel antennas 0 and 1 are grouped together; on a second subchannel, antennas 2 and 3 are grouped together; on a third subchannel antennas 0 and 2 are grouped together; on a fourth subchannel antennas 1 and 3 are grouped together; and so on.

FIG. 5 shows, in simplified block diagram form, details of an embodiment of the invention for use in effecting antenna-group hopping in an OFDM transmit diversity system. Specifically, N length signal vector $X_0=[x_0(0), x_0(1), \ldots, x_0(N-1)]$ to be transmitted is supplied to "signal and select processor, and distributor" 501. Similarly, N length signal vector $X_1=[x_1(0), x_1(1), \ldots, x_1(N-1)]$ also to be transmitted is also supplied to signal and select processor, and distributor 501. As shown above in relationship to the embodiment of the invention of FIG. 2, signal and select processor, and distributor 501 is operative to generate the complex conjugate of signal vector $X_0$, namely, $X_0^*=[x_0^*(0), x_0^*(1), \ldots, x_0^*(N-1)]$, and the reverse sign (−) complex conjugate of signal vector $X_1$, namely, $-X_1^*=[-x_1^*(0), -x_1^*(1), \ldots, -x_1^*(N-1)]$. From the signal components of $X_0$, $X_1$, $X_0^*$ and $-X_1^*$ signal and select processor, and distributor 501 generates, in this example, the matrix of signal as shown in FIG. 6. Specifically, signals are generated as represented by $X_0'$, $X_1'$, $X_2'$, $X_3'$, $X_4'$, $X_5'$, $X_6'$ and $X_7'$. As shown in FIG. 6:

$X_0'=[x_0(0), 0, x_0(2), 0, x_0(4), 0, x_0(6), 0, \ldots]$;

$X_1'=[-x_1^*(0), 0, -x_1^*(2), 0, -x_1^*(4), 0, -x_1^*(6), 0, \ldots]$;

$X_2'=[x_1(0), 0, 0, x_0(3), x_1(4), 0, 0, x_0(7), \ldots]$;

$X_3'=[x_0^*(0), 0, 0, -x_0^*(3), x_0^*(4), 0, 0, -x_1^*(7), \ldots]$;

$X_4'=[0, x_0(1), x_1(2), 0, 0, x_0(5), x_1(6), 0, \ldots]$;

$X_5'=[0, -x_1^*(1), x_0^*(2), 0, 0, -x_1^*(5), x_0^*(6), 0, \ldots]$;

$X_6'=[0, x_1(1), 0, x_1(3), 0, x_1(5), 0, x_1(7), \ldots]$; and $X_7'=[0, x_0^*(1), 0, x_0^*(3), 0, x_0^*(5), 0, x_0^*(7), \ldots]$, where "*" denotes complex conjugate.

Then, $X_0'$ is supplied to IFFT unit 502 that generates the inverse fast Fourier transform thereof, namely, $Z_0'=F^{-1}X_0'$, in a manner similar to that described above in relationship to the embodiment of the invention of FIG. 2. $Z_0'$ is supplied to a first input of controllable selector 503.

Similarly, $X_1'$ is supplied to IFFT unit 504 that generates the inverse fast Fourier transform thereof, namely, $Z_1'=F^{-1}X_1'$, also in a manner similar to that described above in relationship to the embodiment of the invention of FIG. 2. $Z_1'$ is supplied to a second input of controllable selector 503. Controllable selector 503 is responsive to control signals supplied to terminal 515, from select bus 514 generated by signal and select processor, and distributor 501, to realize selection of the signal components during alternate OFDM time intervals, e.g., during even and odd intervals.

The output from controllable selector 503 is supplied to cyclic prefix unit 516 that prepends a cyclic prefix to each OFDM interval, i.e., each symbol period, as described above. Then, the prepended $Z_0'$ or $Z_1'$ signal is converted to analog form via digital-to-analog (D/A) converter 517 and supplied to RF transmitter 518 for transmission via antenna 519, i.e., antenna 0.

$X_2'$ is supplied to IFFT unit 505 that generates the inverse fast Fourier transform thereof, namely, $Z_2'=F^{-1}X_2'$, in a manner similar to that described above in relationship to the embodiment of the invention of FIG. 2. $Z_2'$ is supplied to a first input of controllable selector 506.

Similarly, $X_3'$ is supplied to IFFT unit 507 that generates the inverse fast Fourier transform thereof, namely, $Z_3'=F^{-1}X_3'$, also in a manner similar to that described above in relationship to the embodiment of the invention of FIG. 2. $Z_3'$ is supplied to a second input of controllable selector 506. Controllable selector 506 is responsive to control signals supplied to terminal 520, from select bus 514 generated by signal and select processor, and distributor 501, to realize selection of the signal components during alternate OFDM time intervals, e.g., during even and odd intervals.

The output from controllable selector 506 is supplied to cyclic prefix unit 521 that prepends a cyclic prefix to each OFDM interval, i.e., each symbol period, as described above. Then, the prepended $Z_2'$ or $Z_3'$ signal is converted to analog form via digital-to-analog (D/A) converter 522 and supplied to RF transmitter 523 for transmission via antenna 524, i.e., antenna 1.

$X_4'$ is supplied to IFFT unit 508 that generates the inverse fast Fourier transform thereof, namely, $Z_4'=F^{-1}X_4'$, in a manner similar to that described above in relationship to the embodiment of the invention of FIG. 2. $Z_4'$ is supplied to a first input of controllable selector 509.

Similarly, $X_5'$ is supplied to IFFT unit 510 that generates the inverse fast Fourier transform thereof, namely, $Z_5'=F^{-1}X_5'$, also in a manner similar to that described above in relationship to the embodiment of the invention of FIG. 2. $Z_5'$ is supplied to a second input of controllable selector 509. Controllable selector 509 is responsive to control signals supplied to terminal 525, from select bus 514 generated by signal and select processor, and distributor 501, to realize selection of the signal components during alternate OFDM time intervals, e.g., during even and odd intervals.

The output from controllable selector 509 is supplied to cyclic prefix unit 526 that prepends a cyclic prefix to each OFDM interval, i.e., each symbol period, as described above. Then, the prepended $Z_4'$ or $Z_5'$ signal is converted to analog form via digital-to-analog (D/A) converter 527 and supplied to RF transmitter 528 for transmission via antenna 529, i.e., antenna 2.

$X_6'$ is supplied to IFFT unit 511 that generates the inverse fast Fourier transform thereof, namely, $Z_6'=F^{-1}X_6'$, in a manner similar to that described above in relationship to the embodiment of the invention of FIG. 2. $Z_6'$ is supplied to a first input of controllable selector 512.

Similarly, $X_7'$ is supplied to IFFT unit 513 that generates the inverse fast Fourier transform thereof, namely, $Z_7'=F^{-1}X_7'$, also in a manner similar to that described above in relationship to the embodiment of the invention of FIG. 2. $Z_7'$ is supplied to a second input of controllable selector 512. Controllable selector 512 is responsive to control signals supplied to terminal 530, from select bus 514 generated by signal and select processor, and distributor 501, to realize selection of the signal components during alternate OFDM time intervals, e.g., during even and odd intervals.

The output from controllable selector 512 is supplied to cyclic prefix unit 531 that prepends a cyclic prefix to each OFDM interval, i.e., each symbol period, as described above. Then, the prepended $Z_6'$ or $Z_7'$ signal is converted to analog form via digital-to-analog (D/A) converter 532 and supplied to RF transmitter 533 for transmission via antenna 534, i.e., antenna 3.

It is further noted that the antenna grouping can be in clusters of tones, instead of tone-by-tone. Indeed, other special antenna grouping patterns are also readily realizable without departing from the spirit and scope of the invention. For one clustered OFDM communication system, see U.S. Pat. No. 5,914,933, issued Jun. 22, 1999.

The above-described embodiments are, of course, merely illustrative of the principles of the invention. Indeed, numerous other methods or apparatus may be devised by those skilled in the art without departing from the spirit and scope of the invention. Specifically, it is noted that although the invention was described in terms of pairing signal in time, they could equally be paired in frequency or paired both in time and frequency. Additionally, over sampled signals may be utilized.

What is claimed is:

1. Apparatus for use in a wireless communication system to realize transmit diversity including first and second frequency domain signals to be transmitted comprising:
    a complex conjugate generator for generating a third frequency domain signal representative of a complex conjugate of said first frequency domain signal;
    a reverse sign (−) complex conjugate generator for generating a fourth frequency domain signal representative of a reverse sign (−) complex conjugate of said second frequency domain signal;
    a time domain signal generator for generating first through fourth time domain signals representative of said first through fourth frequency domain signals, respectively;
    pairing apparatus for pairing selected components of said first through fourth time domain signals in prescribed time intervals for transmission, whereby transmit diversity is provided for frequency-fading channels in the wireless communication system; and
    a first antenna and at least a second antenna for transmitting said time domain signals,
    wherein said pairing apparatus includes at least a first controllable selector for controllably selecting signal components of said first time domain signal for transmission on said first antenna during first time intervals and for controllably selecting signal components of said fourth time domain signal for transmission on said first antenna during second time intervals, and a second controllable selector for controllably selecting signal components of said second time domain signal for transmission on said second antenna during first time intervals and for controllably selecting signal components of said third time domain signal for transmission on said second antenna during second time intervals.

2. The apparatus as defined in claim 1 wherein said time domain signal generator includes transformation apparatus for transforming said frequency domain signals into said time domain signals.

3. The apparatus as defined in claim 2 wherein said transformation apparatus includes inverse Fourier transform apparatus.

4. The invention as defined in claim 3 wherein said Fourier transform apparatus includes inverse fast Fourier transform apparatus.

5. The apparatus as defined in claim 4 wherein said fast Fourier transform apparatus includes a plurality of inverse fast Fourier transform unit with a separate inverse fast Fourier transform unit being associated on a one-to-one basis with each of said frequency domain signals.

6. The apparatus as defined in claim 1 wherein said first and second time intervals are orthogonal frequency division multiplexing (OFDM) symbol intervals.

7. The apparatus as defined in claim 6 wherein said time domain signal generator includes a plurality of inverse fast Fourier transform units associated on a one-to-one basis with said frequency domain signals for transforming said frequency domain signals into said time domain signals.

8. The apparatus as defined in claim 7 wherein said first frequency domain signal is of the form $X_0=[x_0(0),x_0(1),\ldots,x_0(N-1)]$ and its corresponding first time domain signal is of the form $Y_0=[y_0(0),y_0(1),\ldots,(N-1)]=F^{-1}(X_0)$, where $F^{-1}$ is the inverse Fourier transform.

9. The apparatus as defined in claim 8 wherein $$y_0(n) = \frac{1}{\sqrt{N}}\sum_{m=0}^{N-1} x_0(m)e^{j2\pi mn/N},$$

for n=0, ..., N−1.

10. The apparatus as defined in claim 7 wherein said second frequency domain signal is of the form $X_1=[x_1(0),x_1(1),\ldots,x_1(N-1)]$ and its corresponding second time domain signal is of the form $Y_1=[y_1(0),y_1(1),\ldots,y_1(N-1)]=F^{-1}(X_1)$, where $F^{-1}$ is the inverse Fourier transform.

11. The apparatus as defined in claim 10 wherein $$y_1(n) = \frac{1}{\sqrt{N}}\sum_{m=0}^{N-1} x_1(m)e^{j2\pi mn/N},$$

for n=0, ..., N−1.

12. The apparatus as defined in claim 7 wherein said third frequency domain signal is of the form $X_0^*=[x_0^*(0), x_0^*(1), \ldots, x_0^*(N-1)]$ and its corresponding third time domain signal is of the form $y_0'=[y_0'(0), y_0'(1), \ldots, y_0'(N-1)]=F^{-1}(X_0^*)$, where $F^{-1}$ is the inverse Fourier transform and * denotes complex conjugate.

13. The apparatus as defined in claim 12 wherein $$y'_0(n) = \frac{1}{\sqrt{N}} \sum_{m=0}^{N-1} x_0^*(m) e^{j2\pi mn/N},$$

for n=0, . . . , N−1 and where * denotes the complex conjugate.

14. The apparatus as defined in claim 7 wherein said fourth frequency domain signal is of the form $-X_1^* = [-x_1^*(0), -x_1^*(1), \ldots, -x_1^*(N-1)]$ and its corresponding fourth time domain signal is of the form $Y_1' = [y_1'(0), y_1'(1), \ldots, y_1'(N-1)] = F^{-1}(X_1^*)$, where $F^{-1}$ is the inverse Fourier transform and * denotes complex conjugate.

15. The apparatus as defined in claim 14 wherein $$y'_1(n) = \frac{1}{\sqrt{N}} \sum_{m=0}^{N-1} -x_1^*(m) e^{j2\pi mn/N},$$

for n=0, . . . , N−1 and where * denotes the complex conjugate.

16. Apparatus for use in a wireless communication system to realize transmit diversity including first and second frequency domain signals to be transmitted comprising:
a time domain signal generator for generating first and second time domain signals representative of said first and second frequency domain signals, respectively;
a reverse order complex conjugate generator for generating a third time domain signal representative of a reverse order complex conjugate of said first time domain signal;
a reverse order, reverse sign (−) complex conjugate generator for generating a fourth time domain signal representative of a reverse order, reverse sign (−) complex conjugate of said second time domain signal;
pairing apparatus for pairing selected components of said first through fourth time domain signals in prescribed time intervals for transmission, whereby transmit diversity is provided for frequency-fading channels in the wireless communication system; and
a first antenna and at least a second antenna for transmitting said time domain signals,
wherein said pairing apparatus includes at least a first controllable selector for controllably selecting signal components of said first time domain signal for transmission on said first antenna during first time intervals and for controllably selecting signal components of said fourth time domain signal for transmission on said first antenna during second time intervals, and a second controllable selector for controllably selecting signal components of said second time domain signal for transmission on said second antenna during first time intervals and for controllably selecting signal components of said third time domain signal for transmission on said second antenna during second time intervals.

17. The apparatus as defined in claim 16 wherein said time domain signal generator includes transformation apparatus for transforming said frequency domain signals into said time domain signals.

18. The apparatus as defined in claim 17 wherein said transformation apparatus includes inverse Fourier transform apparatus.

19. The invention as defined in claim 18 wherein said Fourier transform apparatus includes inverse fast Fourier transform apparatus.

20. The apparatus as defined in claim 19 wherein said fast Fourier transform apparatus includes a plurality of inverse fast Fourier transform unit with a separate inverse fast Fourier transform unit being associated on a one-to-one basis with each of said frequency domain signals.

21. The apparatus as defined in claim 16 wherein said first and second time intervals are orthogonal frequency division multiplexing (OFDM) symbol intervals.

22. The apparatus as defined in claim 21 wherein said time domain signal generator includes a plurality of inverse fast Fourier transform units associated on a one-to-one basis with said frequency domain signals for transforming said frequency domain signals into said time domain signals.

23. The apparatus as defined in claim 22 wherein said first frequency domain signal is of the form $X_0 = [x_0(0), x_0(1), \ldots, x_0(N-1)]$ and its corresponding first time domain signal is of the form $Y_0 = [y_0(0), y_0(1), \ldots, (N-1)] = F^{-1}(X_0)$, where $F^{-1}$ is the inverse Fourier transform.

24. The apparatus as defined in claim 23 wherein $$y_0(n) = \frac{1}{\sqrt{N}} \sum_{m=0}^{N-1} x_0(m) e^{j2\pi mn/N},$$

for n=0, . . . , N−1.

25. The apparatus as defined in claim 22 wherein said second frequency domain signal is of the form $X_1 = [x_1(0), x_1(1), \ldots, x_1(N-1)]$ and its corresponding second time domain signal is of the form $Y_1 = [y_1(0), y_1(1), \ldots, y_1(N-1)] = F^{-1}(X_1)$, where $F^{-1}$ is the inverse Fourier transform.

26. The apparatus as defined in claim 25 wherein $$y_1(n) = \frac{1}{\sqrt{N}} \sum_{m=0}^{N-1} x_1(m) e^{j2\pi mn/N},$$

for n=0, . . . , N−1.

27. The apparatus as defined in claim 22 wherein said third time domain signal is of the form $Y_0' = [y_0'(0), y_0'(1), \ldots, y_0'(N-1)]$.

28. The apparatus as defined in claim 27 wherein $y_0'(n) = y_0^*(N-n)$, for n=0, . . . , N−1, where with reverse order, $y_0'(0) = y_0^*(N) = y_0^*(0)$, $y_0'(1) = y_0^*(N-1), \ldots, y_0'(N-1) = y_0^*(1)$, and where * denotes the complex conjugate.

29. The apparatus as defined in claim 22 wherein said fourth time domain signal is of the form $Y_1' = [y_1'(0), y_1'(1), \ldots, y_1'(N-1)]$.

30. The apparatus as defined in claim 29 wherein $y_1'(n) = -y_1^*(N-n)$, for n=0, . . . , N−1 where with reverse order, $y_1'(0) = -y_1^*(N) = -y_1^*(0)$, $y_1'(1) = -y_1^*(N-1), \ldots, y_1'(N-1) = -y_1^*(1)$, and where * denotes the complex conjugate.

31. Apparatus for use in a wireless communication system to realize transmit diversity including first and second frequency domain signals to be transmitted comprising:
means for generating a third frequency domain signal representative of a complex conjugate of said first frequency domain signal;
means for generating a fourth frequency domain signal representative of a reverse sign (−) complex conjugate of said second frequency domain signal;

means for generating first through fourth time domain signals representative of said first through fourth frequency domain signals, respectively;

first antenna means and at least a second antenna means for transmitting said time domain signals; and means for pairing selected components of said first through fourth time domain signals in prescribed time intervals for transmission, whereby transmit diversity is provided for frequency-fading channels in the wireless communication system, wherein said means for pairing apparatus includes at least a first controllable selector means for controllably selecting signal components of said first time domain signal for transmission on said first antenna means during first time intervals and for controllably selecting signal components of said fourth time domain signal for transmission on said first antenna means during second time intervals and a second controllable selector means for controllably selecting signal components of said second time domain signal for transmission on said second antenna means during first time intervals and for controllably selecting signal components of said third time domain signal for transmission on said second antenna means during second time intervals.

32. The apparatus as defined in claim 31 wherein said means for generating said time domain signals includes means for transforming said frequency domain signals into said time domain signals.

33. The apparatus as defined in claim 32 wherein said means for transforming includes means for obtaining inverse fast Fourier transforms of said frequency domain signals.

34. The apparatus as defined in claim 33 wherein said means for obtaining fast Fourier transforms includes a plurality of means for obtaining inverse fast Fourier transform unit with a separate means for obtaining an inverse fast Fourier transform being associated on a one-to-one basis with each of said frequency domain signals.

35. The apparatus as defined in claim 31 wherein said first and second time intervals are orthogonal frequency division multiplexing (OFDM) symbol intervals.

36. The apparatus as defined in claim 35 wherein said means for generating said time domain signals generator includes a plurality of means for obtaining inverse fast Fourier transforms associated on a one-to-one basis with said frequency domain signals for transforming said frequency domain signals into said time domain signals.

37. Apparatus for use in a wireless communication system to realize transmit diversity including first and second frequency domain signals to be transmitted comprising:

means for generating first and second time domain signals representative of said first and second frequency domain signals, respectively;

means for generating a third time domain signal representative of a reverse order complex conjugate of said first time domain signal;

means for generating a fourth time domain signal representative of a reverse order, reverse sign (−) complex conjugate of said second time domain signal;

a first antenna means and at least a second antenna means for transmitting said time domain signals; and means for pairing selected components of said first through fourth time domain signals in prescribed time intervals for transmission, whereby transmit diversity is provided for frequency-fading channels in the wireless communication system, wherein said means for pairing apparatus includes at least a first controllable selector means for controllably selecting signal components of said first time domain signal for transmission on said first antenna means during first time intervals and for controllably selecting signal components of said fourth time domain signal for transmission on said first antenna means during second time intervals, and a second controllable selector means for controllably selecting signal components of said second time domain signal for transmission on said second antenna means during first time intervals and for controllably selecting signal components of said third time domain signal for transmission on said second antenna means during second time intervals.

38. The apparatus as defined in claim 37 wherein said means for generating first and second time domain signals includes means for transforming said frequency domain signals into said time domain signals.

39. The apparatus as defined in claim 38 wherein said means for transforming includes means for obtaining inverse fast Fourier transforms of said frequency domain signals.

40. The apparatus as defined in claim 39 wherein said means for obtaining fast Fourier transforms includes a plurality of means for obtaining inverse fast Fourier transform unit with a separate means for obtaining an inverse fast Fourier transform being associated on a one-to-one basis with each of said frequency domain signals.

41. The apparatus as defined in claim 37 wherein said first and second time intervals are orthogonal frequency division multiplexing (OFDM) symbol intervals.

42. The apparatus as defined in claim 41 wherein said means for generating said time domain signals generator includes a plurality of means for obtaining inverse fast Fourier transforms associated on a one-to-one basis with said frequency domain signals for transforming said frequency domain signals into said time domain signals.

43. Apparatus for use in a wireless communication system to realize transmit diversity through antenna-group hopping including first and second frequency domain signals to be transmitted comprising:

a complex conjugate generator for generating a third frequency domain signal representative of a complex conjugate of said first frequency domain signal;

a reverse sign (−) complex conjugate generator for generating a fourth frequency domain signal representative of a reverse sign (−) complex conjugate of said second frequency domain signal;

first selection apparatus for selecting prescribed frequency components of said first through fourth frequency domain signals for inclusion into a plurality of frequency domain signals having a selected prescribed relationship to a plurality of antennas including at least three antennas, said selected prescribed relationship being such that two antennas are assigned to each of a plurality of frequency subchannels for transmission of signals;

a convertor for converting said plurality of frequency domain signals into a corresponding plurality of time domain signals; and second selection apparatus for selecting prescribed ones of said plurality of time domain signals in prescribed time intervals for transmission, whereby transmit diversity is provided for frequency-fading channels in the wireless communication system.

44. The apparatus as defined in claim 43 wherein said convertor includes transformation apparatus for transforming said frequency domain signals into said time domain signals.

45. The apparatus as defined in claim 44 wherein said transformation apparatus includes inverse Fourier transform apparatus.

46. The apparatus as defined in claim 45 wherein said Fourier transform apparatus includes a plurality of inverse fast Fourier transform unit with a separate inverse fast Fourier transform unit being associated on a one-to-one basis with each of said frequency domain signals.

47. The apparatus as defined in claim 43 wherein said time intervals are orthogonal frequency division multiplexing (OFDM) symbol intervals.

48. The apparatus as defined in claim 47 wherein said first selector apparatus selects said frequency components such that a different set including two antennas of said at least three antennas is assigned to frequency subchannels in a prescribed sequence of said antenna groups.

49. The apparatus as defined in claim 48 wherein said convertor includes a plurality of inverse fast Fourier transform unit, with a separate inverse fast Fourier transform unit being associated on a one-to-one basis with each of said frequency domain signals.

50. The apparatus as defined in claim 47 further including at least a fourth antenna for transmitting said time domain signals, and wherein said first selector apparatus selects said frequency components such that a different set including two antennas of said at least four antennas is assigned to frequency subchannels in a prescribed sequence of said antenna groups.

51. The apparatus as defined in claim 50 wherein said convertor includes a plurality of inverse fast Fourier transform unit, with a separate inverse fast Fourier transform unit being associated on a one-to-one basis with each of said frequency domain signals.

52. Apparatus for use in a wireless communication system to realize transmit diversity through antenna hopping including first and second frequency domain signals to be transmitted comprising:

means for generating a third frequency domain signal representative of a complex conjugate of said first frequency domain signal;

means for generating a fourth frequency domain signal representative of a reverse sign (−) complex conjugate of said second frequency domain signal;

first means for selecting prescribed frequency components of said first through fourth frequency domain signals for inclusion into a plurality of frequency domain signals having a selected prescribed relationship to a plurality of antennas including at least three antennas, said selected prescribed relationship being such that two antennas are assigned to each of a plurality of frequency subchannels for transmission of signals;

means for converting said plurality of frequency domain signals into a corresponding plurality of time domain signals; and second means for selecting prescribed ones of said plurality of time domain signals in prescribed time intervals for transmission, whereby transmit diversity is provided for frequency-fading channels in the wireless communication system.

53. The apparatus as defined in claim 52 wherein said means for converting includes means for transforming said frequency domain signals into said time domain signals.

54. The apparatus as defined in claim 53 wherein said means for transforming includes means for obtaining inverse Fourier transforms.

55. The apparatus as defined in claim 54 wherein said means for obtaining Fourier transforms includes a plurality of means for obtaining an inverse fast Fourier transform with a separate means for obtaining an inverse fast Fourier transform being associated on a one-to-one basis with each of said frequency domain signals.

56. The apparatus as defined in claim 55 wherein said time intervals are orthogonal frequency division multiplexing (OFDM) symbol intervals.

57. The apparatus as defined in claim 56 wherein said first means for selecting selects said frequency components such that a different set including two antennas of said at least three antennas is assigned to frequency subchannels in a prescribed sequence of said antenna groups.

58. The apparatus as defined in claim 56 wherein said means for converting includes a plurality of means for obtaining an inverse fast Fourier transform, with a separate means for obtaining an inverse fast Fourier transform being associated on a one-to-one basis with each of said frequency domain signals.

59. The apparatus as defined in claim 58 further including a fourth antenna for transmitting said time domain signals, and wherein said first means for selecting selects said frequency components such that a different set including two antennas of said at least four antennas is assigned to frequency subchannels in a prescribed sequence of said antenna groups.

60. The apparatus as defined in claim 59 wherein said means for converting includes a plurality of means for obtaining an inverse fast Fourier transform, with a separate means for obtaining an inverse fast Fourier transform being associated on a one-to-one basis with each of said frequency domain signals.

* * * * *